United States Patent [19]

Marxer

[11] 3,758,527

[45] Sept. 11, 1973

[54] ESTERS OF 1-AMINOALKYL-CYCLOALKANOLS

[75] Inventor: Adrian Marxer, Binningen, Switzerland

[73] Assignee: Ciba-Geigy Corporation, Ardsley, N.Y.

[22] Filed: June 23, 1970

[21] Appl. No.: 49,184

[30] Foreign Application Priority Data
July 4, 1967    Switzerland.................. 10263/69
May 27, 1970    Switzerland.................. 8026/70

[52] U.S. Cl. ...... 260/404, 260/243 B, 260/247.2 B, 260/247.7 A, 260/268 R, 260/293.65, 260/293.68, 260/295.5 R, 260/326.3, 260/326.5 R, 260/332.2 C, 260/343.7, 260/347.5, 260/455 A, 260/463, 260/471 C, 260/471 R

[51] Int. Cl... C07c 91/00, C07c 93/00, C07c 93/24

[58] Field of Search................ 260/490, 404, 486 R, 260/570.8 R, 563 R, 570.9

[56] References Cited
OTHER PUBLICATIONS
Burger, et al., J. Med. Chem., 9, 1966, pp. 968–70.

*Primary Examiner*—Vivian Garner
*Attorney*—Harry Goldsmith, Joseph G. Kolodny and Mario A. Monaco

[57] ABSTRACT

Compounds of the formula

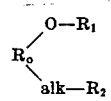

in which $R_0$ stands for a cycloalkylidene radical with 10 to 14 ring members, $R_1$ stands for an acyl radical or hydrogen, alk stands for lower alkylene or the radical

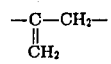

and $R_2$ for a tertiary amino group, are useful as antimicrobial agents.

6 Claims, No Drawings

ESTERS OF 1-AMINOALKYL-CYCLOALKANOLS

SUMMARY OF THE INVENTION

The present invention relates to new 1-aminoalkyl-cycloalkane compounds. Especially it concerns 1-aminoalkylcycloalkane compounds of the formula

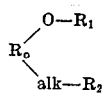

wherein $R_0$ denotes a cycloalkylidene residue with 10 to 14 ring members, $R_1$ denotes an acyl residue, alk denotes a lower alkylene residue which separates $R_0$ from $R_2$ by 3 carbon atoms or a residue of the formula

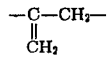

and $R_2$ denotes a tertiary amino group, and their salts, and pharmaceutical preparations containing these compounds, as well as a process for treating bacterial and mycotic infections consisting in administering such pharmaceutical preparations to a warm-blooded being.

A cycloalkylidene residue $R_0$ is for example a cyclodecylidene or cyclotetradecylidene residue, but especially a cycloalkylidene residue with 11 to 13 ring members, such as a cycloundecylidene or cyclotridecylidene residue, or above all a cycloalkylidene residue with 12 ring members, that is to say a cyclododecylidene residue. The cycloalkylidene residue can also be substituted, especially by lower alkyl residues, such as for example by those mentioned below, but above all by methyl or isopropyl residues. It is however preferably unsubstituted.

The residue alk can for example be a 1,3-propylene residue which can also be substituted by lower alkyl residues, above all methyl residues.

The tertiary amino group $R_2$ is especially an aliphatic tertiary amino group, that is to say an amino group which is disubstituted by one bivalent or two monovalent residues of aliphatic character. Here those residues are designated as residues of aliphatic character wherein the first member, linked to the nitrogen atom, is not a member of an aromatic system. Preferred residues of aliphatic character are aliphatic residues. As substituents of a tertiary amino group, the following may be mentioned by way of examples: lower hydrocarbon residues of aliphatic character, which may also be interrupted in the carbon chain by hetero-atoms, such as oxygen, sulphur or nitrogen atoms and/or substituted, for example by hydroxyl groups. Lower hydrocarbon residues of aliphatic character as substituents of the amino groups are above all alkyl, alkenyl, alkylene, alkinyl, cycloalkyl, cycloalkenyl, cycloalkyl-alkyl or cycloalkenyl-alkenyl residues or cycloalkenyl-alkyl or cycloalkyl-alkenyl residues or aralkyl or aralkenyl residues, such as for example phenyl-lower alkyl or phenyl-lower alkenyl residues, which may also be substituted, for example as specified below for the aromatic rings, the above-mentioned residues possessing at most 8 carbon atoms. Residues of this nature which are interrupted by hetero-atoms are above all oxaalkyl or azaalkyl, oxaalkylene, azaalkylene, thiaalkylene or oxacycloalkylalkyl residues. Substituents of the amino groups which should be particularly mentioned are methyl, ethyl, allyl, methallyl, propyl, isopropyl, propargyl, straight-chain or branched butyl, pentyl, hexyl or heptyl residues bonded in any desired position, 3-oxabutyl, 3-oxapentyl, 3-oxaheptyl, 2-hydroxyethyl, 3-hydroxypropyl, butylene-(1,4), pentylene-(1,5), hexylene-(1,5), hexylene-(1,6), hexylene-(2,5), heptylene-(1,7), heptylene-(2,7), heptylene-(2,6), 3-oxapentylene-(1,5), 3-thiapentylene-(1,5), 2,4-dimethyl-3-thiapentylene-(1,5), 3-azapentylene-(1,5), 3-lower alkyl-3-azapentylene-(1,5), such as 3-methyl-3-azapentylene-(1,5), 3-(hydroxy-lower alkyl)-3-azapentylene-(1,5), such as 3-($\beta$-hydroxyethyl)-3-azapentylene-(1,5), 3-oxahexylene-(1,6) or 3-azahexylene-(1,6) residues, optionally lower-alkylated, such as methylated, cyclopropyl, cyclopentyl or cyclohexyl residues or cyclopropyl-, cyclopentyl- or cyclohexyl-methyl or -ethyl residues, or optionally substituted 1- or 2-phentylethyl, benzyl or cinnamyl residues.

The amino group $R_2$ is thus for example a dilower alkylamino group, such as a dimethylamino, diethylamino, N-methyl-ethylamino, dipropylamino, diisopropylamino, dibutylamino, di-sec.butylamino or diamylamino group or a pyrrolidino or piperidino group which is optionally C-lower alkylated and/or $\beta$-singly unsaturated in the ring, or an optionally C-lower alkylated piperazino, N'-lower alkyl- or N'-(hydroxy-lower alkyl)-piperazino, thiomorpholino or morpholino group.

By acyl residues $R_1$ there are above all to be understood those of carboxylic acids. Possible residues are primarily the acyl residues of aliphatic carboxylic acids, especially of those having up to 11 carbon atoms, such as of lower fatty acids, such as of lower alkanoic acids or lower alkenoic acids, for example propionic acid, butyric acid, trimethylacetic acid, acrylic acid, or valeric acid, 10-undecenoic acid, but above all acetic acid, or of substituted fatty acids such as halogen-fatty acids, such as halogen-lower alkanoic acids, for example monochloracetic or dichloracetic acid or trifluoracetic acid. Further possible acyl residues to be considered are the residues of aromatic or araliphatic carboxylic acids, such as of benzoic acids or phenylalkanoic acids or phenylalkenoic acids, for example phenylacetic acids, phenylpropionic acids, or cinnamic acids, and also the acyl residues of heterocyclic carboxylic acids, for example of pyridinecarboxylic, furanecarboxylic or thiophenecarboxylic acids. At the same time the aromatic or heterocyclic rings of these carboxylic acids can also be substituted, for example as specified below for the aromatic rings. Further, the acyl residues can be residues of carbamic acids or thiocarbamic acis, such as carbamyl resudues, lower alkylcarbamyl residues, optionally substituted phenylcarbamyl or phenyl-lower alkylcarbamyl residues, thiocarbamyl residues, lower alkylthiocarbamyl residues or optionally substituted phenylthiocarbamyl or phenyl-lower alkylthiocarbamyl residues. Esterified carboxyl groups, such as carbalkoxy residues are however also possible acyl residues, such as for example lower carbalkoxy residues, such as carbomethoxy or carbethoxy groups.

In the new compounds, substituents possessing aromatic rings may be unsubstituted or possess one, two or more substituents. Such substituents are especially lower alkyl residues, lower alkoxy groups, lower alkenyloxy groups, halogen atoms, trifluoromethyl groups, nitro groups and amino groups.

Lower alkyl residues are for example methyl, ethyl, propyl or isopropyl residues or straight-chain or branched butyl, pentyl or hexyl residues bonded in any desired position. Lower alkoxy residues are above all methoxy, ethoxy, propoxy, isopropoxy or butoxy residues and possible lower alkenyloxy groups are above all allyloxy or methallyloxy residues. Fluorine, chlorine or bromine atoms should above all be mentioned as halogen atoms.

The new compounds possess valuable pharmacological, especially antimicrobial properties with a broad spectrum. Above all they possess bactericidal, bacteriostatic and especially fungicidal and fungistatic properties. Thus the new compounds are for example active against fungi such as for example dermatophytes, for example Trichophyton mentagrophytes, Trichophyton rubrum, Microsporum gypseum, Epidermophyton floccosum and Keratinomyces ajelloi, as well as against aspergillus elegans and against the pathogenic yeast Candida albicans. Against dermatophytes, they for example already show a distinct inhibiting effect at a concentration of about 3 to 20 γ/ml. The new compounds are therefore useful for the topical and systemic treatment of bacterial and especially of mycotic infections. The new compounds are however also valuable intermediate products for the manufacture of other useful substances, especially of pharmacologically active compounds.

Compounds to be particularly emphasised are those of the formula

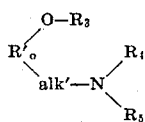

wherein $R_o'$ denotes an optionally lower-alkylated cycloundecylidene, cyclotridecylindene or especially cyclododecylidene residue, $R_3$ represents an optionally halogenated lower alkanoyl residue, for example an acetyl, monochloracetyl, dichloracetyl, or propionyl residue, a lower carbalkoxy residue, a benzoyl residue which is optionally substituted, for example as indicated, a carbamyl, thiocarbamyl, lower alkylcarbamyl or lower alkylthiocarbamyl residue or a phenylcarbamyl or phenylthiocarbamyl residue which is optionally substituted, for example as indicated, $R_4$ and $R_5$ each represents a lower alkyl residue, a lower cycloalkyl residue or a benzyl residue or $R_4$ and $R_5$ together with the nitrogen atom denote an optionally C-lower alkylated pyrrolidino, piperidino, morpholino, thiomorpholino, piperazino, N'-lower alkylpiperazino or N'-(hydroxy-lower alkyl)-piperazino residue, and alk' represents the residue of the formula

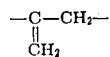

or especially the 1,3-propylene residue.

A particularly active compound is 1-propionyloxy-1-(3-dimethylaminopropyl)-cyclododecane, which for example in the form of its hydrochloride, at a concentration of 3 to 6 γ/ml, shows a distinct inhibiting action on dermatophytes.

Further compounds of importance are those of the formula

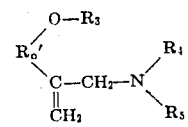

wherein $R_o'$, $R_3$, $R_4$ and $R_5$ have the indicated meanings.

The new compounds are obtained according to methods which are in themselves known.

The preferred procedure is to acylate a compound of the formula

wherein $R_o$, alk and $R_2$ have the indicated meanings, at the hydroxyl group.

The acylation takes place in the usual manner, for example by reaction with an anhydride or halide of an appropriate carboxylic acid.

An acid halide is above all the chlorine and as anhydrides there may be mentioned, in addition to the normal anhydride, for example, internal anhydrides, such as isocyanates, isothiocyanates or ketenes.

If $R_1$ is an esterified carboxyl group, a carbamyl group or a thiocarbamyl group, the acylation can also take place indirectly, for example by reacting with a dihalide of carbonic or thiocarbonic acid, such as phosgene or thiophosgene, and allowing the halogenated carboxyamino group thus obtained to react with an alcohol, a primary or secondary amine or with ammonia, or allowing the halogenated thiocarboxyamino group thus obtained to react with ammonia or a primary or secondary amine.

The reaction with the acid derivative takes place in the usual manner, preferably in the presence of an acid-binding reagent, such as an organic or inorganic base, for example pyridine or alkali carbonates or alkali acetates, preferably in the presence of a solvent and/or diluent, at lowered, normal or elevated temperature and in an open vessel or in a closed vessel under pressure.

Depending on the process conditions and starting substances, the final substances are obtained in the free form or in the form of their acid addition salts which are also comprised by the invention. Thus for example basic, neutral or mixed salts, and where appropriate also hemihydrates, monohydrates, sesquihydrates or polyhydrates thereof, can be obtained. The acid addition salts of the new compounds can be converted into the free compound in a manner which is in itself known, for example by means of basic reagents such as alkalis or ion exchangers. On the other hand, the resulting free bases can form salts with organic or inorganic acids. To manufacture acid addition salts, those acids which are suitable for the formation of therapeutically usable salts are especially employed. As such acids, there may for example be mentioned: hydrohalic acids, sulphuric acids, phosphoric acids, nitric acid, aliphatic, alicyclic, aromatic or heterocyclic carboxylic or sulphonic acids, such as formic, acetic, propionic, succinic, glycollic, lactic, malic, tartaric, citric, ascorbic, maleic, hydroxymaleic or pyruvic acid; phenylacetic, benzoic, p-aminobenzoic, anthranilic, p-hydroxybenzoic, salicyclic or p-aminosalicylic acid, embonic acid, methanesulphonic, ethanesulphonic, hydroxyethanesulphonic and ethylenesulphonic acid: halogenobenzenesulphonic, toluene-sulphonic and naphthalenesulphonic acid or sulphanilic acid; methionine, tryptophan, lysine or arginine, or cyclohexylsulfamic acid.

These or other salts of the new compounds, such as for example the picrates, can also serve for the purification of the resulting free bases, by converting the free bases into salts, isolating these and again liberating the bases from the salts. Because of the close relationship between the new compounds in the free form and in the form of their salts, what has been said above and hereinafter with reference to the free compounds refers similarly also to the corresponding salts whenever such is possible or appropriate under the circumstances.

The new compounds can be in the form of optical antipodes, racemates or isomer mixtures (racemate mixtures) depending on the choice of the starting substances (depending on the number of asymmetric carbon atoms) and on the methods of working.

Resulting isomer mixtures (racemate mixtures) can be resolved into the two stereoisomeric (diastereomeric) pure racemates in a known manner on the basis of the physicochemical differences of the constituents, for example by chromatography and/or by fractional crystallisation.

Resulting racemates can be resolved into the optical antipodes according to known methods, for example by recrystallisation from an optically active solent, with the aid of micro-organisms, or by reaction with an optically active acid which forms salts with the racemic compound and separation of the salts obtained in this manner, for example on the basis of their different solubilities into the diasteromers and the antipodes can be liberated from the diastereomers by the action of suitable reagents. Particularly usual optically active acids are for example the D- and L-forms of tartaric acid, di-o-toluyl-tartaric acid, malic acid, mandelic acid, camphorsulphonic acid or quinic acid. Advantageously, the more active of the two antipodes is isolated.

The invention also relates to those embodiments of the process according to which one starts from a compound obtainable as an intermediate product at any stage of the process and carries out the remaining process stages or in which a starting substance is formed under the reaction conditions or in which a reaction component is optionally present in the form of its salts.

Thus, in particular, the hydroxyl compound to be acylated can be employed in the form of its O-salts, such as the O-metal salts, for example the O-alkali metal salts such as sodium or potassium salts, or of the O-magnesium halide salts, such as magnesium bromide salts, such as are for example produced in the Grignard reaction, that is to say the complex produced in the Grignard reaction can be directly reacted with the acylating reagent.

Appropriately, such starting substances are used for carrying out the reactions according to the invention as lead ot the initially particularly mentioned groups of final substances and particularly to the specially described or emphasised final substances.

The starting substances are known or can, if they are new, be obtained according to methods which are in themselves known.

The compounds of the formula

which are used as preferred starting substances can for example be obtained if a ketone of the formula $$R_o = O$$

wherein $R_o$ has the indicated meaning, is reacted with a compound of the formula $$Hal - Mg - alk - R_2$$

wherein alk and $R_2$ have the indicated meanings and Hal represents chlorine, bromine or iodine, and the resulting complex is decomposed.

The reaction of the compounds mentioned takes place in a manner which is in itself known, particularly in the presence of a solvent or diluent, for example, an ether, such as diethyl ether or tetrahydrofuran. The decomposition of the resulting complex is performed in the usual manner, for example by hydrolysis or aminolysis.

Resulting free compounds and salts can be converted into one another as described above and isomer mixtures which may be obtained can be resolved into the pure racemates, or racemates resolved into the optical antipodes, as described above.

The compounds of the formula

wherein $R_o$, alk and $R_2$ have the indicated meanings, are stil new, with the exception of 1-(3-dimethylaminopropyl)-cyclododecanol, and also form a subject of the present invention.

A further subject of the invention is pharmaceutical preparations containing compounds of the formula

wherein $R_o$, alk and $R_2$ have the indicated meanings, as well as a process for treating bacterial and mycotic infections, which is characterised in that the pharmaceutical preparations mentioned are administered to a warm-blooded being.

The 1-aminoalkyl-cycloalkanols of the above formula also possess bactericidal, bacteriostatic and especially fungicidal and fungistatic properties. In particular, they are active against dermatophytes, for example those mentioned above. Accordingly, they are useful for the topical and systemic treatment of bacterial and especially mycotic infections.

Compounds to be specially emphasised are those of the formula

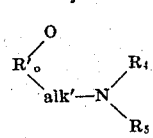

wherein $R_o'$, alk', $R_4$ and $R_5$ have the general and preferred meanings indicated above, and especially 1-(3-dimethylaminopropyl)-cyclododecanol, which for example possesses a distinct inhibiting action on dermatophytes in the form of its hydrochloride at a concentration of 10 to 20 γ/ml.

The 1-(aminoalkyl)-1-acyloxy-cycloalkanes and 1-(aminoalkyl)-cycloalkanols described above can for example be employed in the form of pharmaceutical preparations in which they are present in the free form or optionally in the form of their salts, especially the physiologically tolerable salts, in admixture or conjunction with a pharmaceutical organic or inorganic, solid or liquid excipient which is for example Suitable substances for forming the latter are those which do not react with the new compounds such as for example water, gelatine, lactose, starch, stearyl alcohol, magnesium stearate, talc, vegetable oils, benzyl alcohols, gum, propylene glycols, white petroleum jelly or other known medicinal excipients. The pharmaceutical preparations can for example be in the form of tablets, dragees, capsules, dusting powder, ointments. creams, powders, pastes or aerosols or in a liquid form as solutions (for example as an elixir or syrup), suspensions or emulsions. They are optionally sterilised and/or contain auxiliary substances such as preservatives, stabilisers, wetting agents or emulsifiers, solubilising agents, propellant gases and/or salts for regulating the osmotic pressure or buffers. They can also contain other therapeutically valuable substances. The pharmaceutical preparations for topical administration contain advantageously 0.25 to 5 percent, especially 0.5 to 2 percent of the active ingredient. The pharmaceutical preparations are formulated according to usual methods.

The compounds mentioned can also be employed in the form of feedstuffs or of additives for aninal fodder. Here the usual extenders and diluents and/or feedstuffs are for example employed.

The 1-(aminoalkyl)-1-acyloxy-cycloalkanes and 1-(aminoalkyl)-cycloalkanols described above can also be used as disinfectants or preservatives, for example for the disinfection of skin, of instruments, bandages, laundry or the like, and also for the disinfection and/or preservation of foodstuffs or fodders. They can be employed by themselves or mixed with the usual extenders or carriers.

The 1-(aminoalkyl)-1-acyloxy-cycloalkanes and 1-(aminoalkyl)-cycloalkanols described above also posses an insecticidal and acaricidal action as well as an action against phytopathogenic fungi and can be employed as insecticidal and acaricidal agents and also as agents against phytophathogenic fungi.

The agents according to the invention contain, in addition to the active substances described, a suitable carrier and/or other additives. Suitable carriers and additives may be solid or liquid and correspond to the substances which are usual in formulation technology such as for example natural or regenerated mineral substances, solvents, diluents, dispersing agents, emulsifiers, wetting agents, adhesives, thickeners, binders or fertilisers. The agents can be in the form of dusting agents, emulsion concentrates, sprays, granules, dispersions, solutions or suspensions. They can also contain yet further insecticidal or acaricidal agents or agents against phytopathogenic fungi. The formulations are produced in the usual manner.

The invention is described in more detail in the examples which follow.

Example 1

27.0 g (0.1 mol) of 1-(3-dimethylaminopropyl)-cyclododecanol together with 200 ml of propionic acid anhydrice are warmed for 5 hours to 70°C in a bath. The mixture is concentrated by evaporation in vacuo, and the residue is taken up in 100 ml of ethyl acetate and mixed with 43 ml of a 2.5 N solution of hydrochloric acid in ethanol. On adding a further 100 ml of ethyl acetate the 1-propionyloxy-1-(3-dimethylaminopropyl)-cyclododecane hydrochloride of the formula

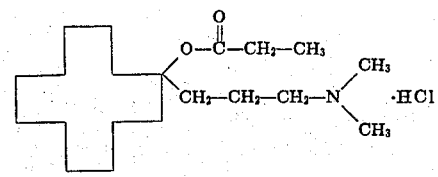

having a melting point of 204° - 205°C crystallises out.

EXAMPLE 2

26.9 g (0.1 mol) of 1-(3-dimethylaminopropyl)-cyclododecanol are dissolved in 150 ml of benzene. 20.0 g (0.2 mols) of triethylamine are then added and 14.1 g (0.1 mol) of benzoyl chloride in 50 ml of benzene are added dropwise to this solution. The mixture is warmed to 70°C for 5 hours, the oily crystals are filtered off, the benzene is extracted three times with water and evaporated to about 100 ml, 50 ml of ethyl acetate are added, and the mixture treated with 59 ml of a 2.1 N solution of hydrochloric acid in ethanol until it reacts acid. After mixing with 200 ml of ether, the 1-benzoyloxy-1-(3-dimethylaminopropyl)-cyclododecane hydrochloride of the formula

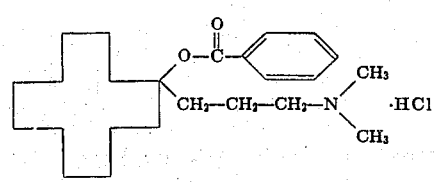

separates out in the form of crystals of melting point 1-73°-175°C.

EXAMPLE 3

13.47 g (0.05 mols) of 1-(3-dimethylaminopropyl)-cyclododecanol are dissolved in 75 ml of benzene. 10.0 g (0.1 mol) of triethylamine are added and 13.12 g (0.075 mols) of p-chlorobenzoyl chloride in 25 ml of benzene are added dropwise to the solution over the course of 20 minutes. The triethylamine hydrochloride is filtered off and the filtrate evaporated to dryness in vacuo. The residue is dissolved in 100 ml of ethyl acetate, mixed with 25 ml of a 2.4 N solution of hydrochloric acid in ethanol, and freed of a small amount of crystals. The mother liquor is mixed with 300 ml of ether and yields the 1-(p-chlorobenzoyloxy)-1-(3-dimethylamino-propyl)-cyclododecane hydrochloride of the formula

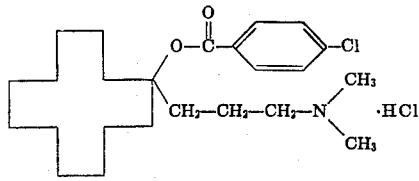

in the form of white needles which after drying in a high vacuum melt at 172° – 175°C.

EXAMPLE 4

A solution of 13.47 g (0.05 mol) of 1-(3-dimethylaminopropyl)-cyclododecanol in 75 ml of benzene is treated with 10.1 g (0.1 mol) of triethylamine. To this solution are then added dropwise 15.21 g of 10-undecenoyl chloride in 25 ml of benzene, and the whole is heated at 70°C for 5 hours. The triethylamine-hydrochloride is filtered off with suction, rinsed with benzene, and the filtrate is evaporated to dryness under reduced pressure. The residue is dissolved in 75 ml of ethyl acetate, the solution treated first with 25 ml of 2.5N-ethanolic hydrochloric acid and then with ethyl acetate (100 ml) until crystallization sets in. The crystalline 1-(10-undecenoyloxy)-1-(3-dimethylaminopropyl)-cyclododecane hydrochloride of the formula

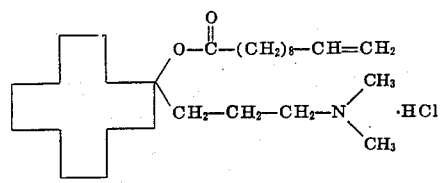

melts at 125° – 127°C.

EXAMPLE 5

17.4 g of 1-[1-(dimethylaminomethyl)-vinyl]-cyclododecanol in 150 ml of propionic acid anhydride are heated at 70°C for 5 hours. The excess acid anhydride is evaporated under reduced pressure, the residue dissolved in 200 ml of acetone, the solution treated with 30 ml of 2.5N-ethanolic hydrochloric acid, followed by ether (about 200 ml) until crystallization sets in. There is obtained 1-[1-(di-methylaminomethyl)-vinyl]-1-(propionyloxy)-cyclododecane hydrochloride of the formula

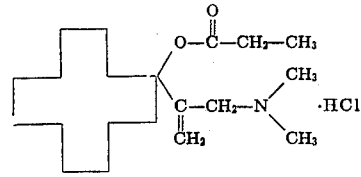

melting at 187° – 189°C.
The 1-[1-(dimethylaminomethyl)-vinyl]-cyclododecanol used as starting material can be obtained as follows:

A Grignard solution is prepared from 7.2 g (0.3 mol) of magnesium and 49.2 g (0.3 mol) of N,N-dimethyl-2-bromallylamine in 70 ml of tetrahydrofuran. The solution is cooled to 25°C, then treated with 45.6 g of cyclododecanone (0.25 mol) in 100 ml of tetrahydrofuran. The batch is then heated at 95°C external temperature for 8 hours, the mixture poured on to 60 g of ammonium chloride in 500 ml of water, and the oil is dissolved in ether. The ethereal phse is freed from crystalline by-products by filtration. The ethereal solution is extracted with a total of 500 ml of 2N-hydrochloric acid, the extract is rendered alkaline with 100 ml of 10N-sodium hydroxide solution, and extracted with ether. Evaporation of the ether gives crude 1-[1-(dimethylaminomethyl)-vinyl]-cyclododecanol which need not be purified prior to further processing.
The hydrochloride of this compound melts at 176° – 181°C.

EXAMPLE 6

13.4 g (0.05 mol) of 1-[1-(dimethylaminomethyl)-vinyl]-cyclododecanol are dissolved in 75 ml of benzene, and the solution is treated with 10.1 g of triethylamine (0.1 mol). 13.12 g (0.075 mol) of para-chlorobenzoyl chloride in 25 ml of benzene are added dropwise, the temperature rising slightly, and the batch is then heated at 70°C for 5 hours. The triethylamine hydrochloride which forms is suctioned off, evaporated under reduced pressure, the residue is dissolved in 75 ml of ethyl acetate, and the solution treated with ethanolic hydrochloric acid until a weakly acid reaction is achieved. On the addition of more ethyl acetate, the crystalline 1-[1-(dimethylaminomethyl)-vinyl]-1-(para-chlorobenzoyloxy)-cyclododecane hydrochloride of the formula

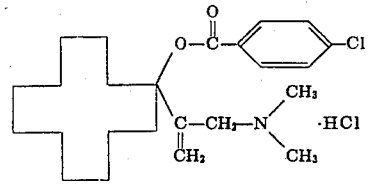

is obtained which melts at 177°C.

EXAMPLE 7

26.9 g (0.1 mol) of 1-(3-dimethylaminopropyl)-cyclododecanol are dissolved in 150 ml of benzene and the solution treated with 20 g (0.2 mol) of triethylamine. 19.55 g (0.15 mol) of furan-2-carboxylic acid chloride in 50 ml of benzene are added dropwise to the solution, the temperature rising to about 30°C. The batch is heated at 70°C for 5 hours, the triethylamine hydrochloride which formed is filtered off with suction, the benzene is evaporated under reduced pressure until the volume is about 100 ml, then 50 ml of ethyl acetate and 55 ml of ethanolic hydrochloric acid (2.4N) are added, and crystallization caused to set in with aobut 100 ml of ether. There is obtained in this manner 1-(2-furoyloxy)-1-(3-dimethylaminopropyl)-cyclododecane hydrochloride of the formula

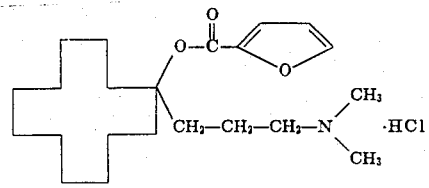

melting at 139°C (sintering from 124°C on).

EXAMPLE 8

A solution of 29.9 g (0.1 mol) of 1-(3-dimethylaminopropyl)-cyclododecanol in 150 ml of benzene is mixed with 20 g (0.2 mol) of triethylamine and then with 22.05 g of thiophene-2-carboxylic acid chloride in 50 ml of benzene. The batch is heated at 70°C for 5 hours, the triethylamine hydrochloride which forms is suctioned off, the benzene is washed with water, dried, evaporated under reduced pressure to a volume of about 100 ml, and 55 ml of 2.4N-ethanolic hydrochloric acid are added, followed by the slow addition of 200 ml of ether. The solvent is evaporated, the residue dissolved in 50 ml of ethyl acetate and the solution allowed to stand for crystallization. There is obtained in this manner 1-(2-thenoyloxy)-1-(3-dimethylaminopropyl)-cyclododecane hydrochloride of the formula

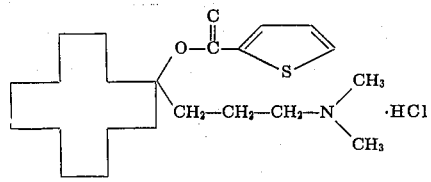

which melts at 177° – 179°C.

EXAMPLE 9

In a manner analogous to that described in Examples 1 to 8, 1-propionyloxy-1-[3-(N'-methylpiperazino)-propyl]-cyclododecane of the formula

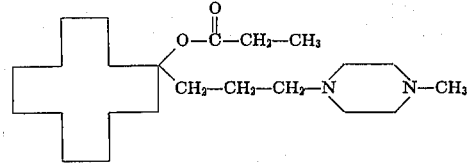

or its dihydrochloride can be obtained by reacting 1-[3-(N'-methylpiperazino)-propyl]-cyclododecanol with propionyl chloride.

The starting material can be obtained as follows:

12.0 g (0.5 mol) of magnesium are activated with iodine and covered with 40 ml of tetrahydrofuran. The reaction is initiated with a small amount of ethyl bromide. Then 88.1 g (0.5 mol) of 3-(N'-methylpiperazino)-propyl-chloride in 100 ml of tetrahydrofuran are added dropwise in such manner that the reaction mixture keeps boiling. The mixture is kept boiling for another 3 hours before 82.0 g (0.45 mol) of cyclododecanone in 200 mol of tetrahydrofuran are added dropwise, then refluxed for a further 8 hours.

The mixture is poured on to 100 g of ammonium chloride in 850 ml of water, then extracted with ether, insoluble by-products are filtered off, and the ether is then extracted with a total of 750 ml 2N-hydrochloric acid. The hydrochloric acid extract is rendered alkaline with 250 ml of 10N-sodium hydroxide solution, and the precipitated oil is extracted with ether. The ethereal residue yields 1-[3-(N'-methylpiperzino)-propyl]-cyclododecanol which in the crude stage melts at 79°–82°C. The dihydrochloride of this compound, prepared in absolute ethanol and ethanolic hydrochloric acid melts at 263° – 265°C.

EXAMPLE 10

In a manner analogous to that described in Examples 1 to 8, 1-propionyloxy-1-[1-(N'-methylpiperazinomethyl)-vinyl]-cyclododecane of the formula

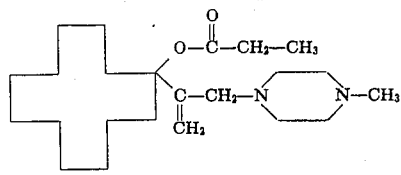

or its dihydrochloride can be obtained by reacting 1-[1-(N'-methylpiperazinomethyl)-vinyl]-cyclododecanol with propionyl chloride.

The starting material can be obtained as follows:

7.2 g (0.3 mol) of magnesium are activated and covered with 20 ml of tetrahydrofuran. The reaction is started with about 0.8 g of ethyl bromide, after which 65.7 g (0.3 mol) of 1-(2-bromallyl)-4-methyl-piperazine in 50 ml of tetrahydrofuran are added dropwise. The mixture is refluxed for 2 hours, 54.6 g (0.3 mol) of cyclododecanone in 125 ml of tetrahydrofuran are added dropwise, and the batch is refluxed for another 8 hours. The batch is poured into 6 g of ammonium chloride in 500 ml of water, then extracted with ether, the ether is filtered, and extracted with a total of 600 ml of 2N-hydrochloric acid. The hydrochloric acid extract is cooled and treated with 100 ml of 6.15N-hydrochloric acid, whereupon crystallization sets in. In this manner, 1-[1-(N'-methylpiperazinomethyl)-vinyl]-cyclododecanol dihydrochloride is obtained which melts at 215°C with decomposition.

EXAMPLE 11

A salve containing 0.5 percent of active substance can be made in the usual manner, for example from the following ingredients:

| | |
|---|---|
| 1Propionyloxy-1-(3-dimethylaminopropyl)-cyclododecane hydrochloride | 0.5 g |
| beeswax | 2.0 g |
| white petroleum jelly | 97.5 g |
| | 100.0 g |

EXAMPLE 12

A salve containing 2.0 percent of active substance can be made in the usual manner, for example from the following ingredients:

| | |
|---|---|
| 1-propionyloxy-1-(3-dimethylaminopropyl)-cyclododecane hydrochloride | 2.0 g |
| beeswax | 2.0 g |
| white petroleum jelly | 96.0 g |
| | 100.0 g |

In an analogous manner, a salve containing 2.0 percent of 1-(3-dimethylaminopropyl)-cyclododecanol hydrochloride can be made.

EXAMPLE 13

By acylation with the appropriate acid derivatives of the following carbinols:

1-[3-(allyl-cylopentylamino)-2-methyl-propyl]-cyclodecanol,
1-[3-(propargyl-methoxyethyl-amino)-propyl]-cyclotridecanol,
1-[3-(cyclopropylmethyl-1-cyclohexenyl-amino)-propyl]-cyclotetradecanol,
1-[3-(para-chlorobenzyl-ortho-methoxyphene-thylamino)-propyl]-cycloundecanol,
1-[1-(piperidinomethyl)-vinyl]-2-isopropyl-cyclododecanol,
1-[1-(pyrrolidinomethyl)-vinyl]-cyclododecanol,
1-(3-morpholinopropyl)-2-methyl-cyclododecanol,
1-[3-(N'-$\beta$-hydroxyethylpiperazino)-propyl]-cyclododecanol there are obtained
1-(dichloroacetoxy)-1-[3-(allyl-cyclopentylamino)-2-methylpropyl]-cyclodecane,
1-(meta-methylcinnamoyloxy)-1-[3-(propargyl-methoxyethyl-amino)-propyl]-cyclotridecane,
1-(ortho-nitro-hydrocinnamoyloxy)-1-[3-(cyclopropylmethyl-1-cyclohexenyl-amino)-propyl]-cyclotetradecane,
1-(2-methyl-3-pyridoyloxy)-1-[3-(para-chlorobenzyl-ortho-methoxyphenethylamino)-propyl]-cycloundecane,
1-(5-methyl-2-thenoyloxy)-1-[1-(piperidinomethyl)-vinyl]-2-isopropyl-cyclododecane,
1-(ethylthiocarbomoyloxy)-1-[1-(pyrrolidinomethyl)-vinyl]-cyclododecane,
1-(meta-methoxyphenylcarbamoyloxy)-1-(3-morpholinopropyl)-2-methyl-cyclododecane,
1-(para-chlorophenethylcarbamoyloxy)-1-[3-(N'-$\beta$-hydroxyethylpiperazino)-propyl]-cyclododecane, respectively.

I claim:

1. A compound of the formula

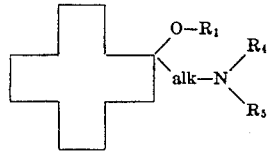

wherein
R$_1$ represents an acyl residue of an alkanoic or alkenoic acid having from 1 to 11 carbon atoms,
each of R$_4$ and R$_5$ represents lower alkyl, lower cycloalkyl or benzyl, and
alk represents 1,3-propylene or 2,3-propen-(1)-ylene, or an acid addition salt thereof.

2. A compound of claim 1 in which R$_1$ represents an acyl residue of a lower alkanoic acid, and R$_4$ and R$_5$ represent lower alkyl.

3. The compound of claim 2 which is the 1-propionyloxy-1-(3-dimethylaminopropyl)-cyclododecane or an acid addition salt thereof.

4. The compound of claim 2 which is the 1-[1-(dimethylaminomethyl)-vinyl]-1-(propionyloxy)-cyclododecane or an acid addition salt thereof.

5. A compound of claim 1 in which R$_1$ represents the acyl residue of 10-undecylenic acid, and R$_4$ and R$_5$ represent lower alkyl.

6. The compound of claim 5 which is the 1-(10-undecenoyloxy)-1-(3-dimethylaminopropyl)-cyclododecane or an acid addition salt thereof.

* * * * *